(12) United States Patent
Buchanan, Jr. et al.

(10) Patent No.: US 6,192,585 B1
(45) Date of Patent: Feb. 27, 2001

(54) BALL NUT AND METHOD OF HIGH VOLUME MANUFACTURING OF SAME

(75) Inventors: Harry C. Buchanan, Jr.; Yaomin Dong, both of Dayton; Frederick M. Goerz, Kettering, all of OH (US)

(73) Assignee: Valeo Electrical Systems, Inc., Auburn Hills, MI (US)

( * ) Notice: Subject to any disclaimer, the term of this patent is extended or adjusted under 35 U.S.C. 154(b) by 0 days.

(21) Appl. No.: 09/187,311

(22) Filed: Nov. 4, 1998

(51) Int. Cl.[7] .................................................. B21D 51/16
(52) U.S. Cl. .......................................... 29/898.06; 74/459
(58) Field of Search ........................... 29/898.06, 898.02, 29/898.054, 898.045, 898.057, 898.062, 898.063, 898.066, 898.07; 74/89.15, 424.8 R, 459

(56) References Cited

U.S. PATENT DOCUMENTS

| | | | |
|---|---|---|---|
| 2,502,066 | * 3/1950 | Tanner | 74/459 |
| 3,192,791 | * 7/1965 | Gieby | 29/898.06 |
| 3,327,551 | 6/1967 | Prueter . | |
| 3,455,004 | * 7/1969 | Tethal | 29/898.037 |
| 4,074,587 | 2/1978 | Brusasco . | |
| 4,272,476 | 6/1981 | Benton . | |
| 4,905,534 | * 3/1990 | Andonegui | 74/459 |
| 4,924,722 | * 5/1990 | Bacardit et al. | 74/459 |
| 4,945,781 | 8/1990 | Isert . | |
| 5,193,409 | * 3/1993 | Babinski | 74/459 |
| 5,295,407 | * 3/1994 | Hirose et al. | 74/459 |
| 5,388,475 | 2/1995 | Shear, III et al. . | |
| 5,988,007 | * 11/1999 | Nishimura | 74/459 |

* cited by examiner

Primary Examiner—David P. Bryant
Assistant Examiner—Marc W. Butler
(74) Attorney, Agent, or Firm—J. Gordon Lewis

(57) ABSTRACT

A ball nut has at least one internal bearing race with a first end and second end, and at least one recirculating crossover passage for connecting the first end with the second end of the bearing race to form a continuous recirculating path for a plurality of ball bearings. A method for producing a ball nut includes the steps of forming at least a portion of the ball nut body with a helix passage for receiving a plurality of ball bearings, forming a crossover passage in communication with the helix passage for returning the plurality of ball bearings to an opposite end of the helix passage, and assembling the ball nut body portions to position the helix passage and operable orientation with respect to the crossover passage to define at least one raceway having a single recirculating rotational path for receiving the plurality of ball bearings. The ball nut body can be formed by being drawn, coined, metal injection molded, roll formed, through rolled, stamped and/or overmolded. The crossover passage can be formed integrally with the ball nut body, or can be formed as an insert or plug formed of a plastic material or metal injection molded, or can be performed during an over mold operation.

57 Claims, 5 Drawing Sheets

BALL NUT AND METHOD OF HIGH VOLUME MANUFACTURING OF SAME

FIELD OF THE INVENTION

The invention relates to a ball nut and a method of producing a nut for a ball nut and screw assembly featuring at least one recirculating ball crossover passage to form a continuous recirculating path for a plurality of ball bearings.

BACKGROUND OF THE INVENTION

Power screws used in automotive actuators are approximately 40% to 60% in efficiency and are most often not capable of being back driven. Using a ball screw could increase mechanical efficiency into the range of 85% to 95%. Currently, high volume ball screws are more expensive than using a larger motor. However, if a low cost ball screw were available, certain transverse actuators could be made smaller and with higher performance. To accomplish this, ball screws must be approximately one tenth of the current prices.

In a typical ball nut and screw configuration, the elements provide a traveling finite raceway for guiding an endless train of anti-friction balls between their relatively moveable nut and screw. To enable the use of an endless train of balls, it is necessary to return the balls from one end of the raceway to the other end to provide for ball recirculation, the direction of ball return being dependant on the relative directional movement between the relatively moveable inner and outer members.

Previously known balls provide a return tube secured to the outer periphery of the outer member, where the return tube is bent at its ends to extend through accommodating apertures in the outer member to meet with the raceway. While generally satisfactory, such a structure can impose undue restrictions in its application because of the additional radial space occupied by the return tube and because of the possibility of damage to the return tube such as by denting or crushing, which can render the device inoperative. In addition, the apertures for accommodating the ends of the return tube must be located precisely which can raise the cost factor. Furthermore, the cost factor can be raised by the requirement of securing the return tube accurately in place by a securing device, such as clamp.

Alternatively, it has been known to provide a return passageway through the interior of one of the relatively moveable members instead of having the balls lead outwardly to a return tube. It should be apparent that providing such a passageway with the necessary curvature internally of one of the members is difficult and expensive. In an attempt to decrease the difficulty and expense of manufacturing the internal passageway, it has been proposed that a ball return passageway be disposed between the inner and outer members, where the passageway was provided by a channel in one of the members for unloading the balls to either end of the raceway. Ball screw assemblies are commonly used to translate rotary motion to linear motion or vice a versa. The ball nut body in cooperation with the ball screw direct a plurality of ball bearings through an internal bearing race formed between the ball nut body and ball screw in response to relative motion between the ball screw and the ball nut body. The ball bearings translate rotary motion of the ball screw to linear motion of the ball nut body, or translates rotary motion of the ball nut body into linear motion of the ball screw. Both the elongate ball screw and ball nut body commonly include a continuous helical groove which defines the internal bearing race.

Continuous contact between the ball bearings and that portion of the ball screw forming the bearing race causes significant wear of those parts over time. It is known that the components comprising the bearing race must be made from materials that have strength values capable of handling high stresses. Known relationships must be maintained between the helical grooves that recirculate the balls through the ball nut body. The entire ball nut body is commonly manufactured from steel and one or more grooves are precision machined within the ball nut body to provide the required relationship for recirculation. The best known methods of manufacturing steel nut bodies incorporating an internal helical groove result in relatively heavy ball nut bodies which are expensive to manufacture. These single piece or unitary ball nut bodies are normally produced by a mechanical chip-forming machining operation starting from a block of steel. To alleviate the cost of manufacturing steel nut bodies, it has been proposed to form the ball nut body from a fiber reinforced polymeric material. Expansion and contraction of the ball nut body polymeric material due to extreme temperature variances may affect operation of the internal bearing circuits. In addition, the fiber reinforced polymeric material is incapable of withstanding the high stresses imposed on steel ball nut bodies and lacks the desired resistance to wear when subjected to high load use over extended periods of time.

It has also been proposed to provide a ball nut having a composite structure with an inner sleeve preferably constructed by rolling, or by molding as a complete piece or in sectors or by a profiled resilient winding while an intermediate sleeve is preferably constructed by direct molding on the inner sleeve with reinforced plastics or sintered steel. Alternatively, the intermediate sleeve can be constructed separately by molding. In this case two half-shells can be constructed, which are welded together to integrate the intermediate sleeve defining the crossover passageway after mounting on the inner sleeve. The proposed ball nut of composite material also includes an outer sleeve acting as a closing cover for the crossover passage or channel after a sufficient number of balls have been inserted to completely fill the recirculating path.

Another known ball nut configuration includes a metal blank nut having internal helical grooves which are the same as those of a master nut. The master ball nut is used in order to create a silicone imprint mold which includes a positive profile of a portion of the helical groove of the nut and the ball crossover channels properly aligned therewith. With the imprint mold secured in place, a liquid thermal set resin is employed to fill the radial holes and on to the profile of the crossover channels. The resin is allowed to harden as a permanent plug in the radial holes to form crossover members with internal crossover channels which mirror those of the master mold. After the crossover members have hardened, the silicone imprint mold is readily removed from the nut so that the nut can be assembled with a screw and trains of balls in a conventional manner. The silicone imprint mold can subsequently be used with a second ball nut blank to make molded crossover plugs for a second assembly. The plugs are molded from a thermal set resin injected into radially extending apertures, disposed ninety degrees (90°) to the rotational axis of the nut, that have been bored through the walls of the ball nut. The resinous crossover plugs adhere to the walls of the openings after curing so that no additional fastening means are needed to maintain the plugs in position.

SUMMARY OF THE INVENTION

The present invention reduces the cost of manufacturing ball nuts in high volume, thereby making the technology feasible for automotive actuators. In a first embodiment, the present invention includes a metal injection molding process for producing a ball nut using a special metal injection molding 4650 stainless steel or equivalent part molded into proper geometry to attain a satisfactory ball surface finish with or without further machining depending on the particular application. The metal injection molded ball nut can be carburized to achieve a hardness of Rockwell ($R_c$) between 55 $R_c$ to 65 $R_c$ and preferably 58 $R_c$, well in the range required for the desired actuator life. The present invention uses one race rotation with a plastic side insert providing ball stops and crossover geometry. Additional ball race circuits can be placed in parallel with one another to achieve higher loads. In this embodiment, the part is small and cost is proportional to the volume of metal injection molded material used.

A second embodiment of the present invention provides for coining or through rolling a groove in a flat steel strip, like a 410 stainless steel (martinsitic) or equivalent, with 17–7 PH for non-working parts. After coining or rolling the groove in the flat steel strip, the strip is rolled to proper diameter and lead. The finished ring closely resembles a large mechanical lock washer with a groove on the inside diameter. The rolled strip can be inserted in a carrier with crossover passages and properly overmolded or inserted depending on the required application.

A third embodiment according to the present invention uses thinner or constant thickness material and roll forms the race groove configuration. The strip is then formed to the proper diameter and lead. The formed part is then inserted into a carrier with the crossover. The material preferably is 410 stainless steel with 17–7 PH or equivalent, so that the finished part can be hardened for optimum ball screw life.

The fourth embodiment according to the present invention provides for producing a ball nut by stamping the part and forming the crossover as part of the stamping operation. The part is formed to proper lead and diameter, and then hardened.

A fifth embodiment according to the present invention provides for producing a ball nut by using a drawn eyelet type of construction. An eyelet is formed with a helix in the flange end, and a crossover is defined in the flange end to give a ball return. The drawn and coined eyelet is designed to fit exactly with a duplicate part, trapping the balls between the two, flange-to-flange parts. A temporary holding lock can be provided to hold the parts together during transfer to a molding machine. The part is then overmolded to assure a solidly configured ball nut. The steel preferably UNS 610090 or equivalent, is hardened to 55 $R_c$ to 65 $R_c$, and preferably 62 $R_c$ hardness and iron nitride hardened, or alternatively stainless steel, preferably UNS 541000 or equivalent, is spherodized, annealed and heat treated. Tabs can be placed on the flange to provide for temporary assembly. A punch can also be provided to assist travel of the ball into the crossover passage.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED AND ALTERNATIVE EMBODIMENTS

Figure 1:
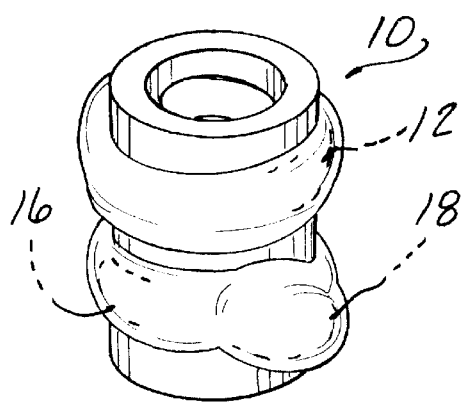
FIG. 1 is an isometric view of a metal injection molded ball nut according to the present invention.
Figure 2:
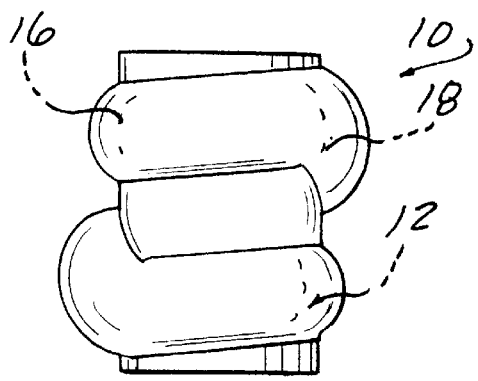
FIG. 2 is a front elevational view of the metal injection molded ball nut of FIG. 1.
Figure 3:
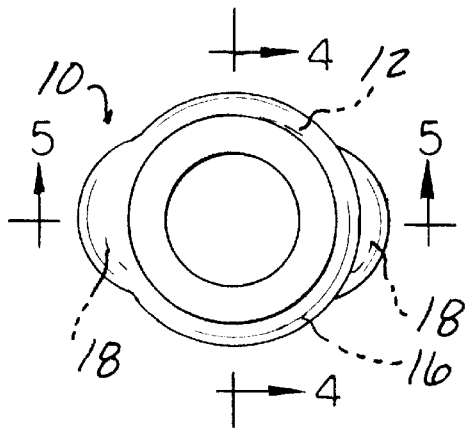
FIG. 3 is a bottom view of the metal injection molded ball nut of FIG. 2.
Figure 4:
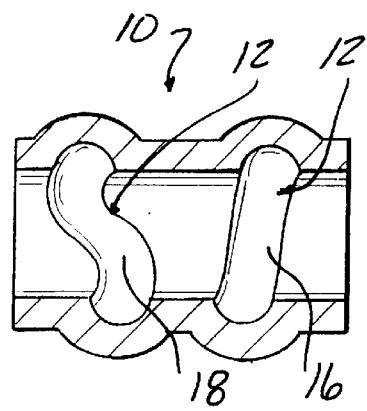
FIG. 4 is a cross-sectional view of the metal injection molded ball nut taken as shown in FIG. 3.

Referring now to FIGS. 1 through 9, a ball nut 10 according to the present invention is illustrated. The ball nut 10 in this embodiment is preferably formed by metal injection molding. As illustrated, the ball nut 10 includes one or more recirculating passages 12 for receiving a plurality of ball bearings 14. Each recirculating passage 12 includes a helical groove portion 16 and a crossover passage portion 18. The metal injection molded ball nut 10 can be formed with one or more recirculating passages 12 depending on the load to be carried by the ball nut 10. If multiple passages are provided, it is preferable to space the location of the crossover passage portion 18 at different angular locations with respect to one another. As illustrated in the drawings, showing a two passage ball nut 10, the crossover passage portions 18 are disposed at 180° with respect on another. Preferably, the crossover passage portions 18 are disposed in equal spaced angular orientations with respect to one another.

Figure 5:
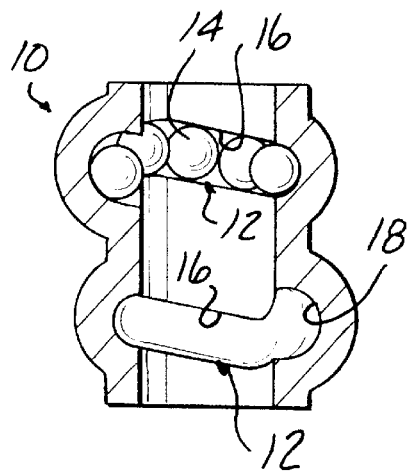
FIG. 5 is a cross-sectional view of the metal injection molded ball nut taken as shown in FIG. 3.
Figure 6:
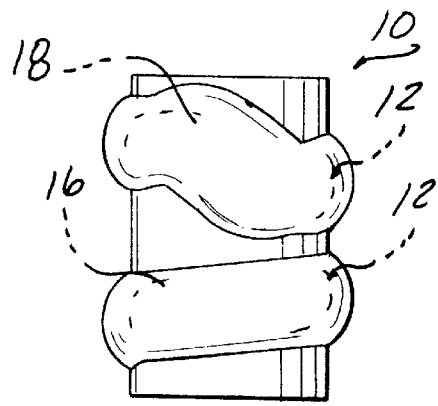
FIG. 6 is a side elevational view of the metal injection molded ball nut of FIG. 2.
Figure 7:
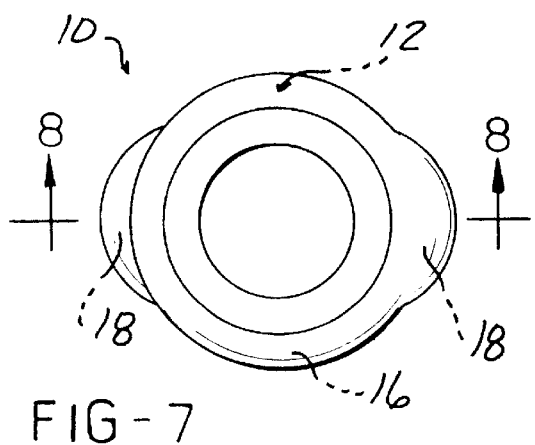
FIG. 7 is a top view of the metal injection molded ball nut of FIG. 2.
Figure 8:
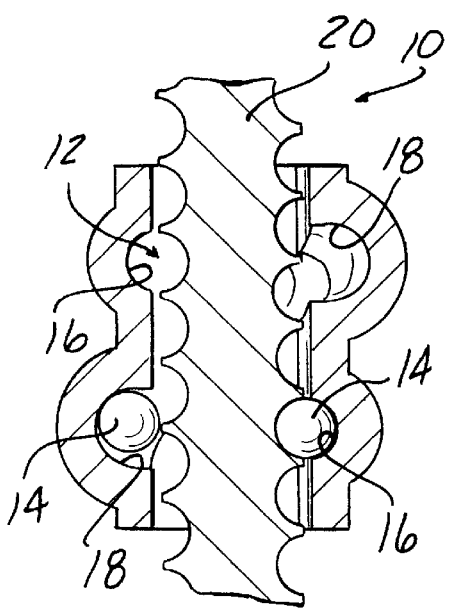
FIG. 8 is a cross-sectional view of the metal injection molded ball nut taken as shown in FIG. 7.
Figure 9:
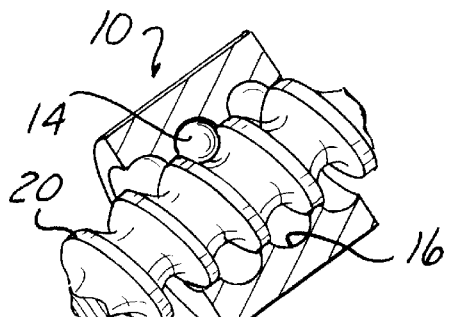
FIG. 9 is a cross-sectional perspective view of a metal injection molded ball nut according to the present invention assembled with respect to a screw with a plurality of ball bearings engaged between the ball nut and the screw for relative motion between the two members.

In FIG. 5, a plurality of ball bearings 14 are shown in one of the passages for purposes of illustration. In FIG. 8, a plurality of ball bearings 14 are shown in operable contact with a screw 20, while the second passage is shown without the ball bearings 14 for purposes of clarity in order to illustrate the recirculating passage 12. Preferably, it is desirable to reduce the amount of metal material used in metal injection molded ball nuts 10. This can result in a contoured external surface as illustrated in FIGS. 1 through 8. However, it should be recognized that an alternative or straight contour configuration can be provided, such as that illustrated in FIG. 9.

Figure 13:
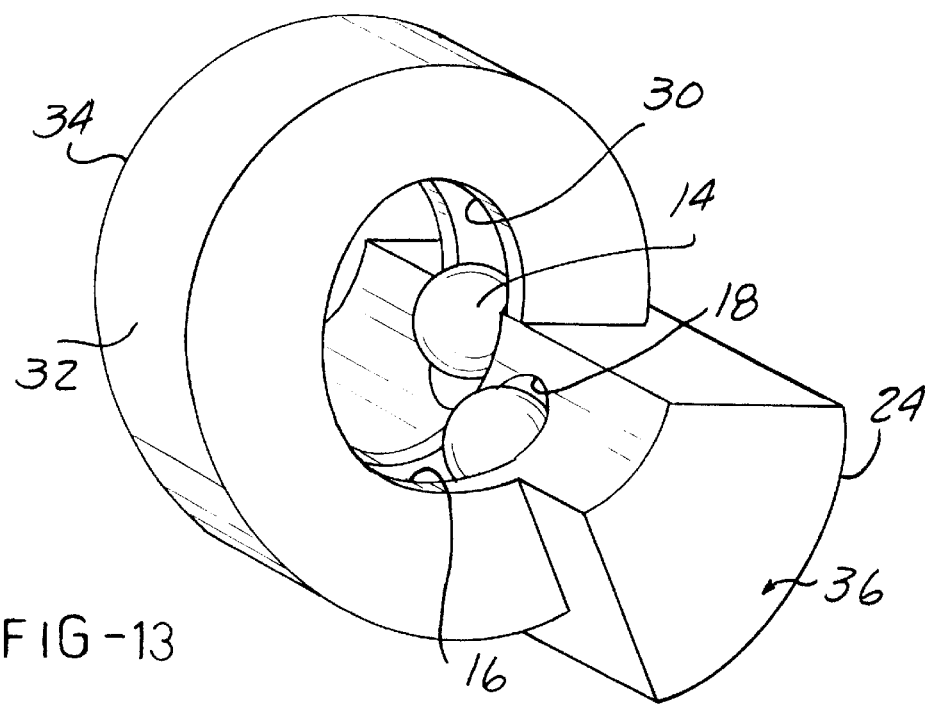
FIG. 13 is a fourth step in manufacturing a roll formed ball nut according to the present invention.
Figure 16:
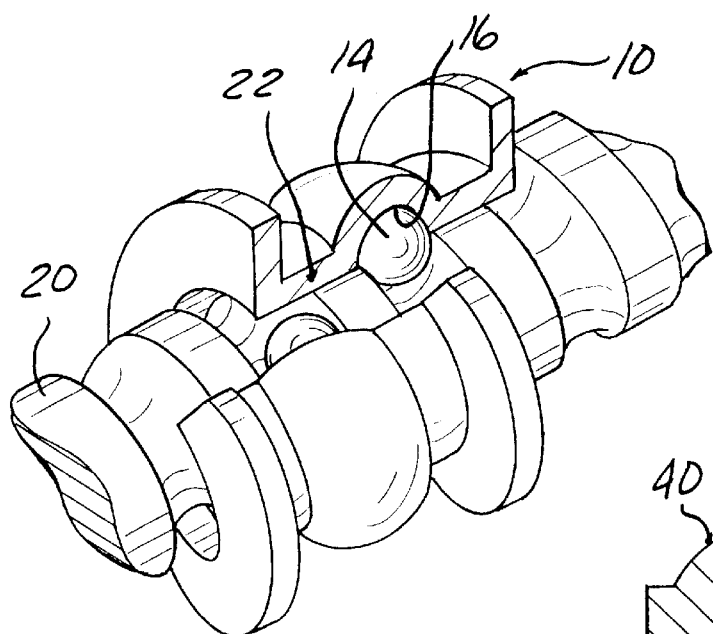
FIG. 16 is a partially cut-away perspective view of a thin walled roll formed ball nut according to the present invention assembled in combination with a screw and a plurality of ball nuts according to the present invention.

The present invention discloses a method for producing a ball nut 10 having at least one internal bearing race or recirculating passage 12 with a first end and a second end. At least one recirculating crossover passage 18 connects the first end with the second end to form a continuous recirculating path for a plurality of ball bearings 14. The method includes the step of metal injection molding an elongate, generally cylindrical-shaped ball nut body with a helical passage, or helical groove portion 16 for receiving a plurality of ball bearings 14. Referring now to FIG. 16, the ball nut body 10 includes a slot 22 defined through a portion of the circumference extending along an entire longitudinal length of the ball nut body, so that the ball nut body has a generally C-shaped cross-section along an entire longitudinal length similar to that illustrated in FIG. 16. A side insert (not shown) similar to insert 24 in FIG. 13 is engageable within the slot 22 formed in the ball nut body 10. The side insert 24 preferably includes ball-stops and a crossover passage defined therein. The side insert 24 is assembled with respect to the ball nut body 10 to define at least one raceway or recirculating passage 12. The raceway 12 preferably defines a single recirculating rotational path for receiving the plurality of ball bearings 14. In the preferred configuration, the side insert 24 can be formed of a plastic material or can be metal injection molded.

The assembling step according to the present invention can also include the step of defining a plurality of individual raceways having separate recirculating rotational paths 12 disposed parallel to one another for receiving the plurality of ball bearings 14. The ball nut body 10 preferably in this embodiment is injection molded of stainless steel. The method according to the present invention can also include the step of carburizing the ball nut body 10 to a hardness of approximately 55 $R_c$ to 65 $R_c$ and preferably approximately 58 $R_c$. The present invention can also include the step of providing a satisfactory ball-engaging surface finish for the efficiency desired.

Figure 10:
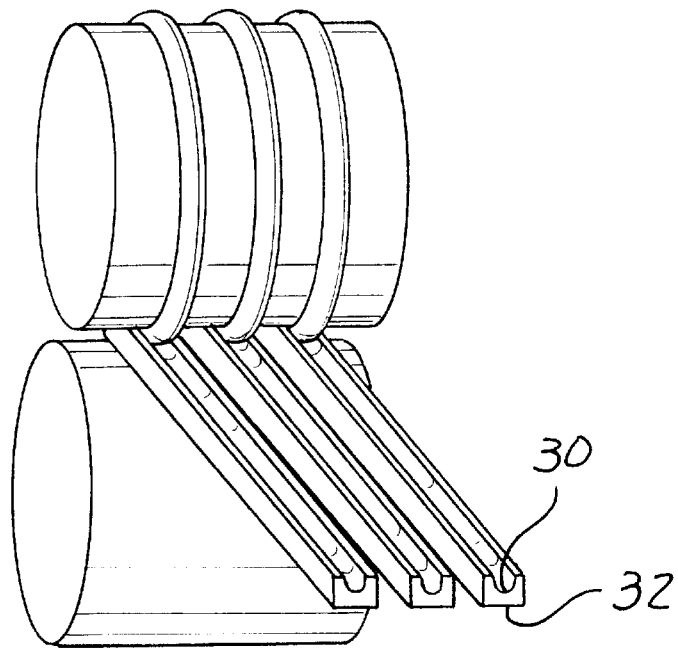
FIG. 10 is a perspective simplified view of a first step in a roll forming operation in manufacturing a roll formed ball nut according to the present invention.
Figure 11:
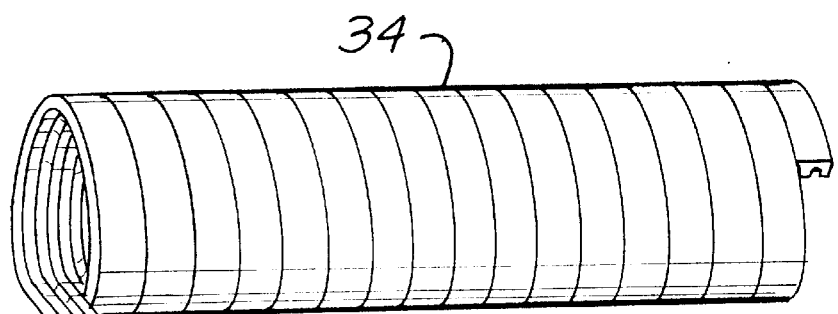
FIG. 11 is a second step in manufacturing the roll formed ball nut following the step illustrated in FIG. 10.
Figure 12:
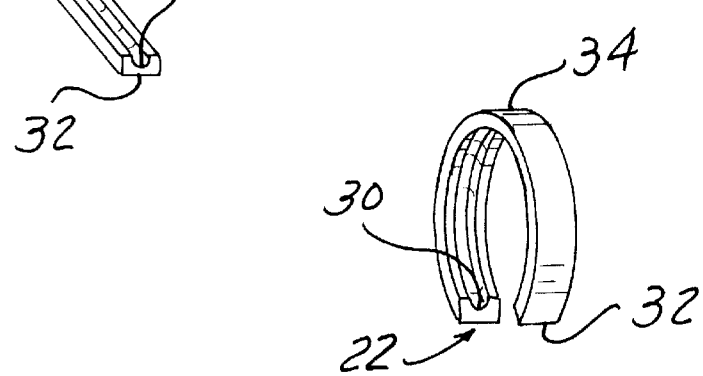
FIG. 12 is a third step in manufacturing a roll formed ball nut according to the present invention.

Referring now to FIGS. 10 through 13, the method according to the present invention produces a ball nut 10 having at least one internal bearing race with a first end and a second end. At least one recirculating crossover passage 18 connects the first end with the second end of the helical groove portion 16 to form a continuous recirculating path 12 for a plurality of ball bearings 14. The method according to the present invention can include the step of forming at least one groove 30 in a flat metal strip 32 as illustrated in FIG. 10. After forming the groove 30, the flat metal strip 32 is then rolled to a predetermined diameter and lead with at least one groove 30 facing radially inward as illustrated in FIG. 11. The rolled strip 34 is inserted into a carrier 36 having a crossover passage 18 formed therein to define at least one raceway having at least one recirculating rotational path 12 for receiving the plurality of ball bearings 14. The method according to this embodiment of the present invention can include the step of coining the groove 30 in the flat metal strip 32. The forming step according to the present invention can also include through rolling the groove 30 in the flat metal strip 32. Preferably, the flat metal strip 32 is formed of a 410 martinsitic stainless steel material or equivalent. The method according to the present invention can also include the step of over molding the carrier 36 after insertion of the rolled strip 34. According to the present invention, one or more grooves 30 can be formed in the flat metal strip 32, or multiple flat metal strips 32 can be rolled into a generally cylindrical configuration with the grooves facing radially inwardly to form a plurality of recirculating paths with respect to one another. In the preferred configuration, the finished ring closely resembles a large mechanical lock washer with a groove on the inside diameter. The part can be inserted in a carrier 36, or can be engaged with a side insert 24 including the required crossover passage 18. The carrier 36 or side insert 24 can be formed of plastic material or metal injection molded and can include one or more crossover passages as required for the particular application.

Figure 14:
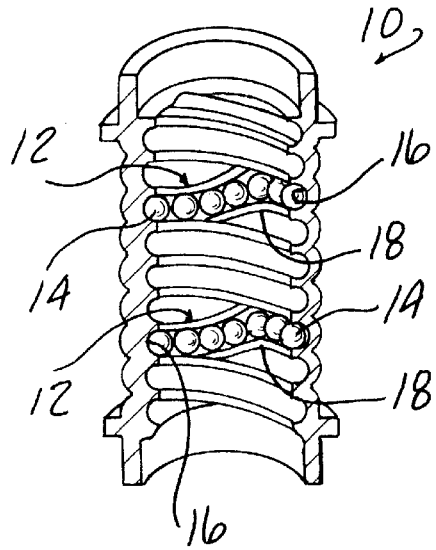
FIG. 14 is a thin walled roll formed ball nut according to the present invention.
Figure 15:
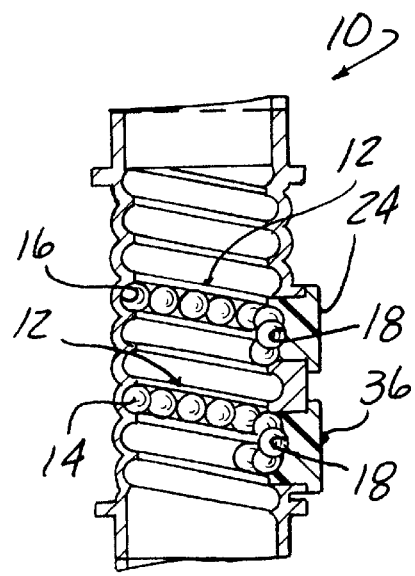
FIG. 15 is a thin walled roll formed ball nut having plastic or metal injection molded crossover plugs disposed therein according to the present invention.

Referring now to FIGS. 14 through 16, the present invention can include the embodiment where the forming step includes roll forming a groove 30 in the flat metal strip 32 defining a race for receiving the plurality of ball bearings 14. Preferably, the strip 32 in this embodiment is formed of a relatively thin, constant thickness, metal material prior to roll forming. The roll formed ball nut 10 according to this embodiment of the invention is formed from a thin and preferably constant thickness metal material. The groove is roll formed to define the race and/or recirculating passage 12 for receiving the plurality of ball bearings 14. The roll forming step also shapes the flat metal strip or sheet 32 into the proper diameter and lead. The roll formed ball nut body is then inserted into a carrier having the crossover passage formed therein. The carrier can take the form of an enclosure encompassing the body, or an insert formed of plastic material, or metal injection molded material with the crossover passage formed therein, similar to that illustrated in FIG. 13, or as a plug insert similar to that illustrated in FIG. 15. The material for the roll formed ball nut body 10 according to this embodiment of the present invention is preferably formed of a 410 stainless steel with 17–7 PH or equivalent so that the finished part can be hardened for optimum ball screw life. Preferably, the rolled metal strip is hardened after forming the groove and after rolling to the predetermined diameter and lead.

Figure 17:
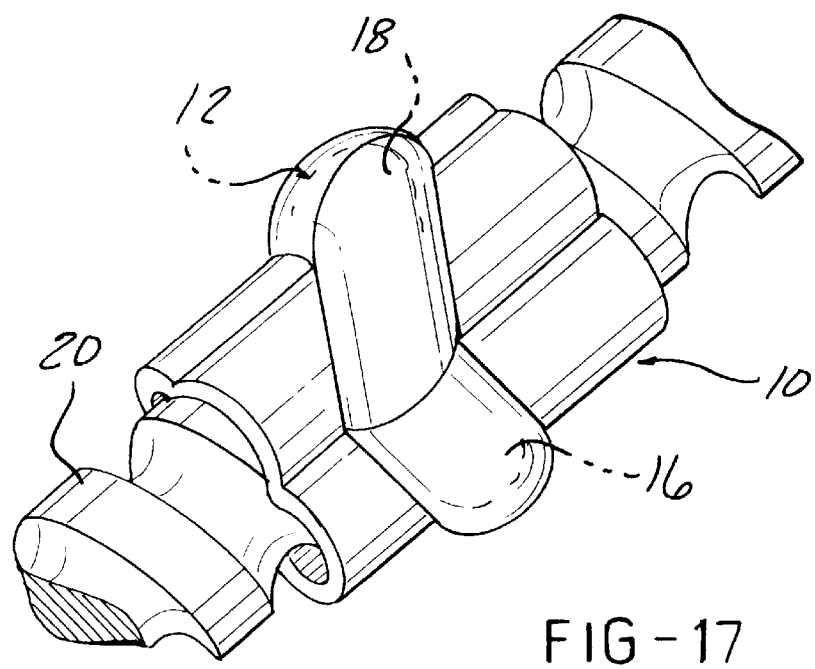
FIG. 17 is a perspective view of a ball nut manufactured by stamping and forming according to the present invention in two parts and assembled in combination with a screw and a plurality of ball bearings.

Another embodiment according to the present invention includes forming the ball nut body 10 by stamping the groove 30 in a flat metal strip or sheet 32 for receiving a plurality of ball bearings 14. This configuration is illustrated in FIG. 17. The crossover passage is also stamped in the flat metal sheet, so that the crossover passage 18 is in communication with the groove for returning the plurality of ball bearings 14 from one end of the helical groove portion 16 to an opposite end. The stamped ball nut body 10 is formed to the proper lead and diameter. Preferably, after the stamping step and the forming step, the ball nut body 10 is hardened. The stamped ball nut body 10 can be formed with one or more individual raceways having separate recirculating rotational paths disposed parallel to one another for receiving the plurality of ball bearings. Multiple stamped ball nut bodies can be overmolded into a single unitary ball nut configuration in order to increase the load carrying capacity of the ball nut as required for the particular application.

Figure 19:
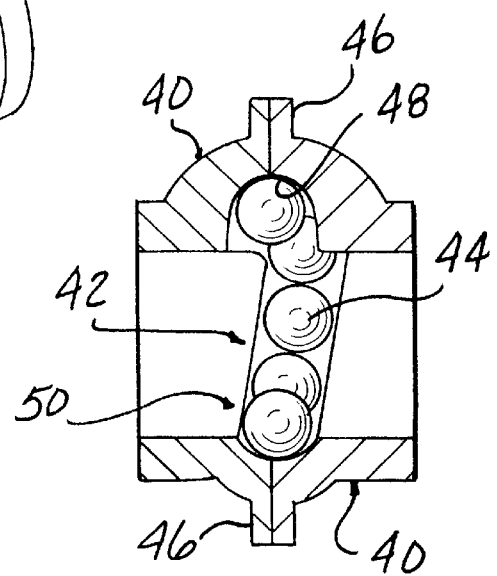
FIG. 19 is a cross-sectional view of the ball nut illustrated in FIG. 18 with the screw removed for purposes of clarity.
Figure 18:
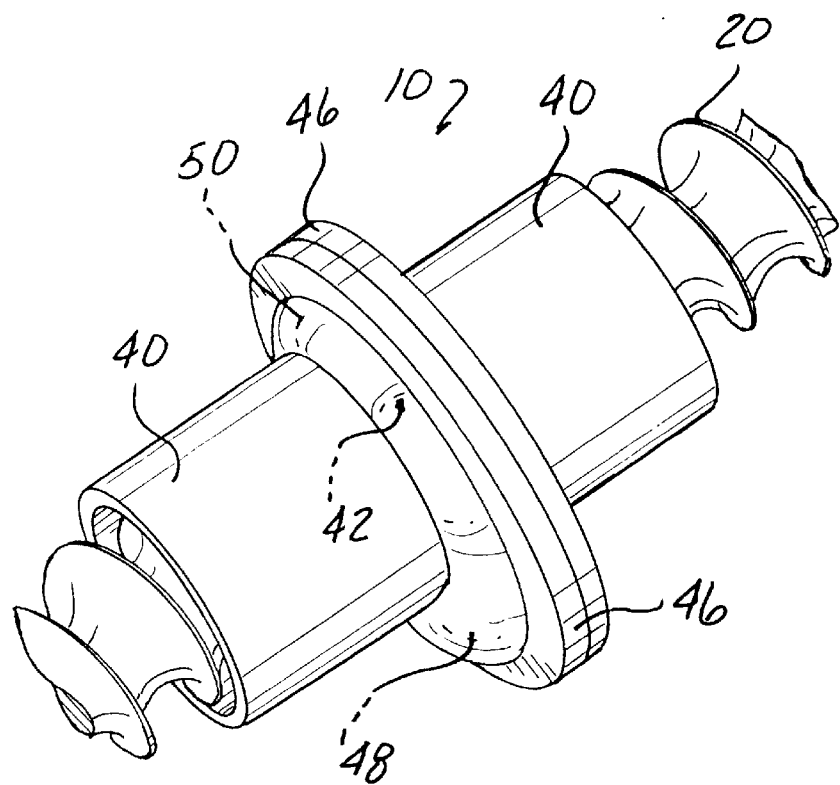
FIG. 18 is a stamped ball nut according to the present invention in two parts and assembled in flange to flange relationship with one another to form a single recirculating path for a plurality of ball bearings and assembled in combination with a screw.

Referring now to FIGS. 18 and 19, the preferred embodiment of the present invention includes a ball nut and method for producing a ball nut 10 having at least one internal bearing race with a first end and a second end. At least one recirculating crossover passage 18 connects the first end with the second end of the helical groove portion 16 to form a continuous recirculating path 12 for a plurality of ball bearings 14. The method according to the preferred embodiment of the present invention includes forming an eyelet 40 with a helix passage 42 for receiving a plurality of ball bearings 44 in a flange end 46. A crossover passage 48 is defined in the flange end 46, such that the crossover passage 48 is in communication with the helix passage 42 for returning the plurality of ball bearings 44 from one end of the helix passage 42 to an opposite end of the helix passage 42. To eyelets 40 are assembled in flange-to-flange relationship with respect to one another to define at least one raceway having a single recirculating rotational path 50 for receiving the plurality of ball bearings 44. The method according to the present invention can also include the step of over molding the assembled eyelets 40 to provide a unitary ball nut. Preferably, the eyelets 40 in the assembling step are identical to one another. The forming step can include the steps of drawing an eyelet 40, and coining the helix passage 42 and the crossover passage 48 in the flange 46 of the eyelet 40. The assembling step can also include the step of temporarily holding the two eyelets 40 with respect to one another with a lock member 52. The forming step can define at least one tab 54 on the flange end 46 of the eyelet 40 to define the lock member 52. The assembling step can include inserting the plurality of ball bearings 44 within the helix passage 42 and the crossover passage 48 during the assembling step. A punch (not shown) in the helix passage 42 can be provided to direct ball bearings 44 into the crossover passage 48. Preferably, the eyelet is formed of a metal material selected from the group including steel, hardened steel, melonited steel, heat treated steel, stainless steel, spherodized stainless steel, annealed stainless steel and heat treated stainless steel. Preferably, the eyelet is hardened to approximately 62 $R_c$ after the forming process.

According to the preferred embodiment of the present invention, a drawn eyelet 40 is formed with a helix passage 42 in the flange end 46, and a crossover passage 48 is defined to provide a ball return to the helix passage 42. The drawn and coined eyelet 40 is designed to fit exactly with a duplicate drawn and coined eyelet 40 to trap the balls 44 between the two when positioned in flange-to-flange relationship with respect to one another. A temporary holding lock 52 can be provided to hold the eyelets 40 together during transfer to a molding machine. The assembled eyelets 40 are overmolded, to provide a solidly configured ball nut. Preferably, the eyelet 40 is manufactured from steel, such as UNS 610090, hardened to approximately 55 $R_c$ to approximately 65 $R_c$ and preferably to approximately 62 $R_c$ and iron nitride hardened, or stainless steel, such as UNS 54000, spherodized, annealed and heat treated. The lock 52 can include one or more tabs 54 placed on the flange end 46 to temporarily hold the assembly together. A punch (not shown) may be provided to direct the balls 44 into the crossover passage 48.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A method for producing a ball nut having at least one internal bearing race with a first end and a second end, and at least one recirculating crossover passage for connecting the first end with the second end to form a continuous recirculating path for a plurality of ball bearings, comprising the steps of:

forming an eyelet with a helix passage for receiving a plurality of ball bearings in a flange end;

defining a portion of a crossover passage in the flange end, the crossover passage in communication with the helix passage for returning the plurality of ball bearings; and assembling two eyelets in flange-to-flange relationship with respect to one another to define at least one raceway having a single recirculating rotational path sassing through aligned portions of the crossover passage formed by the flange-to-flange relationship of the two eyelets for receiving the plurality of ball bearings.

2. The method of claim 1 further comprising the step of:
   over molding the assembled eyelets to provide a unitary ball nut.

3. The method of claim 1 wherein the eyelets assembled in the assembling step identical to one another.

4. The method of claim 1 wherein the forming step further comprises the steps of:
   drawing an eyelet; and
   coining the helix passage and crossover passage in the flange end of the eyelet.

5. The method of claim 1 wherein the assembling step further comprises the step of:
   temporarily holding the two eyelets with respect to one another with a lock member.

6. The method of claim 5 wherein the forming step further comprises the step of:
   forming at least one tab on the flange end of the eyelet to define the lock member.

7. The method of claim 1 wherein the assembling step further comprises the step of:
   inserting the plurality of ball bearings within the helix passage and the crossover passage during the assembling step.

8. The method of claim 1 further comprising the step of:
   providing a punch in the helix passage to direct ball bearings into the crossover passage.

9. The method of claim 1 wherein the eyelet is formed of a metal material selected from a group including steel, hardened steel, melonited steel, heat treated steel, stainless steel, spherodized stainless steel, annealed stainless steel, and heat treated stainless steel.

10. The method of claim 1 further comprising the step of:
    hardening the eyelet to approximately $R_c$ 62.

11. In a ball nut produced according to the method of claim 1, the ball nut having at least one internal bearing race with a first end and a second end, and a crossover passage for connecting the first end and the second end to form a continuous recirculating path for a plurality of ball bearings, the improvement comprising:

at least two eyelets, each eyelet having a portion of a helix passage for receiving a plurality of ball bearings formed in a face of a flange end and a portion of a crossover passage formed in the face of the flange end, the crossover passage in communication with the helix passage for returning the plurality of ball bearings, the two eyelets operably engageable in face-to-face, flange-to-flange relationship with respect to one another to define one raceway having a single recirculating rotational path passing through aligned portions of the crossover passage formed by the face-to-face, flange-to-flange relationship of the two eyelets for receiving the plurality of ball bearings.

12. The ball nut of claim 11 further comprising:
the assembled eyelets overmolded to provide a unitary ball nut.

13. The ball nut of claim 11 wherein the eyelets are identical to one another.

14. The ball nut of claim 11 further comprising:
the eyelet drawn and coined to form the helix passage and crossover passage in the flange end of the eyelet.

15. The ball nut of claim 11 further comprising:
a lock member for temporarily holding the two eyelets with respect to one another.

16. The ball nut of claim 11 further comprising:
a lock member for temporarily holding the two eyelets with respect to one another.

17. The ball nut of claim 11 further comprising:
the plurality of ball bearings inserted within the helix passage and the crossover passage during assembly.

18. The ball nut of claim 11 further comprising:
a punch in the helix passage to direct ball bearings into the crossover passage.

19. The ball nut of claim 11 wherein the eyelet is formed of a metal material selected from a group including steel, hardened steel, melonited steel, heat treated steel, stainless steel, spherodized stainless steel, annealed stainless steel, and heat treated stainless steel.

20. The ball nut of claim 11 further comprising:
the eyelet hardened to approximately $R_c$ 62.

21. A method for producing a ball nut having at least one internal bearing race with a first end and a second end, and at least one recirculating crossover passage for connecting the first end with the second end to form a continuous recirculating path for a plurality of ball bearings, comprising the steps of:
forming an elongate, generally cylindrical-shaped ball nut body with at least one helix passage for receiving a plurality of ball bearings;
forming an aperture through a peripheral portion of the ball nut body;
forming an insert engageable within the aperture formed in the ball nut body, the insert having ball-stops and a crossover passage defined therein for each helix passage intersecting the aperture; and
connecting the insert with respect to the ball nut body to define one raceway having a single orbit recirculating rotational path for each helix passage intersecting the aperture.

22. The method of claim 21 wherein the side insert is formed of plastic.

23. The method of claim 21 wherein the ball nut body is injection molded of stainless steel.

24. The method of claim 21 further comprising the step of:
carburizing the ball nut body to a hardness of approximately 58 $R_c$.

25. The method of claim 21 further comprising the step of:
providing a ball-engaging surface finish of approximately 30–40µ inches.

26. In a ball nut produced according to the method of claim 21, the ball nut having at least one internal bearing race with a first end and a second end, and a crossover passage for connecting the first end and the second end to form a continuous recirculating path for a plurality of ball bearings, the improvement comprising:
an elongate, generally cylindrical-shaped, ball nut body with at least one helix passage for receiving a plurality of ball bearings, and an aperture formed through a peripheral portion of the ball nut body; and
an insert engageable within the aperture formed in the ball nut body, the insert having ball-stops and a crossover passage defined therein for each helix passage intersecting the aperture, the insert connected with respect to the aperture in the ball nut body to define one raceway having a single orbit recirculating rotational path for each helix passage intersecting the aperture.

27. The ball nut of claim 26 further comprising:
the ball nut body having a slot defined through a portion of the circumference extending along an entire longitudinal length of the ball nut body, such that the ball nut body has a generally C-shaped cross-section along the entire longitudinal length; and
a side insert formed engageable with the slot in the ball nut body, the side insert having ball-stops and a crossover passage defined therein, and the side insert assembled with respect to the ball nut body to define at least one raceway having a single recirculating rotational path for receiving the plurality of ball bearings.

28. The ball nut of claim 27 wherein the side insert is formed of plastic.

29. The ball nut of claim 26 wherein the ball nut body is injection molded of stainless steel.

30. The ball nut of claim 26 further comprising:
the ball nut body carburized to a hardness of approximately 58 $R_c$.

31. The ball nut of claim 26 further comprising:
a ball-engaging surface finish of approximately 30–40µ inches.

32. A method for producing a ball nut having at least one internal bearing race with a first end and a second end, and at least one recirculating crossover passage for connecting the first end with the second end to form a continuous recirculating path for a plurality of ball bearings, comprising the steps of:
metal injection molding an elongate, generally cylindrical-shaped ball nut body with at least one helix passage for receiving a plurality of ball bearings; and
forming a crossover passage to define an individual raceway for each helix passage, each raceway having a separate single orbit recirculating rotational path.

33. In a ball nut produced according to the method of claim 14, the ball nut having at least one internal bearing race with a first end and a second end, and a crossover passage for connecting the first end and the second end to form a continuous recirculating oath for a plurality of ball bearings, the improvement comprising:
an elongate, generally cylindrical-shaped, metal injection molded ball nut body with at least one helix passage for receiving a plurality of ball bearings, a crossover passage formed to define an individual raceway for each helix passage, each raceway having a separate, single orbit, recirculating rotational path.

34. The ball nut of claim 33 further comprising:
a helical portion of each recirculating path formed to extend less than an entire circumference of an interior of the ball nut body from a first end to a second end; and a crossover passage portion of each recirculating path to extend formed in communication between the first and the second end of the corresponding helical portion.

35. The ball nut of claim 34 further comprising:

each crossover passage portion angularly offset with respect to a longitudinally adjacent crossover passage portion.

36. The method of claim 32 further comprising the steps of:

forming a helical portion of each recirculating path to extend less than an entire circumference of an interior of the ball nut body from a first end to a second end; and forming a crossover passage portion of each recirculating path to extend in communication between the first and the second end of the corresponding helical portion.

37. The method of claim 36 further comprising the step of:

angularly offsetting each crossover passage portion with respect to a longitudinally adjacent crossover passage portion.

38. A method for producing a ball nut having at least one internal bearing race with a first end and a second end, and at least one recirculating crossover passage for connecting the first end with the second end to form a continuous recirculating path for a plurality of ball bearings, comprising the steps of:

forming at least one groove in an elongate flat metal strip for receiving a plurality of ball bearings;

helically rolling the elongate strip into a predetermined diameter and lead with the at least one groove facing radially inward, each groove having first and second ends opposite from one another; and inserting the rolled strip into a carrier having a crossover passage formed therein to define one raceway for each groove having one single orbit recirculating rotational path for receiving the plurality of ball bearings from one end of each groove for delivery to the opposite end of each groove.

39. The method of claim 38 wherein the forming step further comprises the step of:

coining the groove in the flat metal strip.

40. The method of claim 38 wherein the forming step further comprises the step of:

through rolling the groove in the flat metal strip.

41. The method of claim 38 wherein the flat metal strip is formed of 410 martinsitic stainless steel.

42. The method of claim 38 further comprising the step of:

over molding the carrier after insertion of the rolled strip.

43. The method of claim 38 wherein the forming step further comprises the step of:

roll forming a groove in the strip defining a race for receiving the plurality of ball bearings, the strip formed of a constant thickness metal material.

44. The method of claim 43 further comprising the step of:

hardening the strip after roll forming the groove and rolling to the predetermined diameter and lead.

45. In a ball nut produced according to the method of claim 38, the ball nut having at least one internal bearing race with a first end and a second end, and a crossover passage for connecting the first end and the second end to form a continuous recirculating path for a plurality of ball bearings, the improvement comprising:

an elongate flat metal strip having at least one groove formed therein for receiving a plurality of ball bearings, the elongate strip helically rolled into a predetermined diameter and lead with the at least one groove facing radially inward, each groove having first and second ends opposite from one another; and a carrier for receiving the rolled strip inserted therein, the carrier having a crossover passage formed therein to define one raceway for each groove, each raceway having one single orbit recirculating rotational path for receiving the plurality of ball bearings from one end of each groove for delivery to the opposite end of each groove.

46. The ball nut of claim 45 further comprising:

the flat metal strip having a coined groove.

47. The ball nut of claim 45 further comprising:

the flat metal strip having a through rolled groove.

48. The ball nut of claim 45 wherein the flat metal strip is formed of 410 martinsitic stainless steel.

49. The ball nut of claim 45 further comprising:

the carrier overmolded after insertion of the rolled strip.

50. The ball nut of claim 45 further comprising:

the strip having a roll formed groove therein defining a race for receiving the plurality of ball bearings, the strip formed of a constant thickness metal material.

51. The ball nut of claim 50 further comprising:

the strip hardened after roll forming the groove and rolled to the predetermined diameter and lead.

52. The ball nut of claim 45 further comprising:

the flat metal strip having a stamped groove and a stamped crossover passage therein for receiving a plurality of ball bearings, the crossover passage in communication with the groove for returning the plurality of ball bearings from one end of the groove to an opposite end.

53. The ball nut of claim 52 further comprising:

the stamped metal strip hardened after rolling to the predetermined diameter and lead.

54. A method for producing a ball nut having at least one internal bearing race with a first end and a second end, and at least one recirculating crossover passage for connecting the first end with the second end to form a continuous recirculating path for a plurality of ball bearings, comprising the steps of:

stamping a first part with a first portion of a groove and a first portion of a crossover passage in a first face of a first flange region from a flat metal strip for receiving a plurality of ball bearings;

stamping a second part with a second portion of the groove and a second portion of the crossover passage in a second face of a second flange region in the flat metal strip, the second portions of the groove and crossover passage of the second part operably positionable in communication with the first portions of the groove and crossover passage of the first part for returning the plurality of ball bearings from one end of the groove to an opposite end; and assembling the first and second stamped parts in face-to-face, flange-to-flange relationship with respect to one another to define a ball nut with a continuous recirculating path for a plurality of ball bearings.

55. The method of claim 54 further comprising the step of:

hardening the first and second stamped parts after the rolling step.

56. In a ball nut produced according to the method of claim 54, the ball nut having at least one internal bearing race with a first end and a second end, and a crossover passage for connecting the first end and the second end to form a continuous recirculating path for a plurality of ball bearings, the improvement comprising:

a first stamped part having a first portion of a groove and a first portion of a crossover passage formed in a first face of a first flange for receiving a plurality of ball bearings;

a second stamped part having a second portion of the groove and a second portion of the crossover passage formed in a second face of a second flange, the second part operably positionable in face-to-face, flange-to-flange communication with the first part for returning the plurality of ball bearings from one end of the groove to an opposite end; and means for connecting the first and second parts in face-to-face, flange-to-flange relationship with respect to one another to define a ball nut with a continuous recirculating path for a plurality of ball bearings.

57. The method of claim 54 wherein the first and second stamped parts are identical to one another.

* * * * *